United States Patent
Thiagarajan

(10) Patent No.: US 10,848,358 B2
(45) Date of Patent: Nov. 24, 2020

(54) METHOD AND SYSTEM PROVIDING FOURIER TRANSFORM BASED SIGNAL PROCESSING WITH REDUCED COMPUTATIONAL COMPLEXITY

(71) Applicant: MMRFIC Technology Pvt. Ltd., Bangalore (IN)

(72) Inventor: Ganesan Thiagarajan, Bengaluru (IN)

( * ) Notice: Subject to any disclaimer, the term of this patent is extended or adjusted under 35 U.S.C. 154(b) by 0 days.

(21) Appl. No.: 16/163,824

(22) Filed: Oct. 18, 2018

(65) Prior Publication Data
US 2019/0123944 A1    Apr. 25, 2019

(51) Int. Cl.
*H04L 27/22* (2006.01)
*G06F 17/14* (2006.01)
*H04L 27/26* (2006.01)

(52) U.S. Cl.
CPC ............ *H04L 27/22* (2013.01); *G06F 17/142* (2013.01); *H04L 27/263* (2013.01); *H04L 27/265* (2013.01)

(58) Field of Classification Search
CPC ... G06F 17/142; H04L 27/263; H04L 27/265; H04L 27/22
See application file for complete search history.

(56) References Cited

U.S. PATENT DOCUMENTS

| 5,831,883 A | * | 11/1998 | Suter | G06F 17/142 |
| | | | | 708/404 |
| 2015/0146826 A1 | * | 5/2015 | Katabi | H04L 27/265 |
| | | | | 375/340 |
| 2016/0277083 A1 | * | 9/2016 | Koike-Akino | H04B 7/0456 |

* cited by examiner

*Primary Examiner* — Sung S Ahn

(57) ABSTRACT

According to an aspect of the present invention, a signal processor comprises an N-point phase FFT transformer operative to perform a FFT like transformation according to a first relation $$Y[k] = \sum_{n=0}^{n=N-1} \exp^{[j \, angle \, [x(n)]]} * \exp\left[\frac{-j2\pi kn}{N}\right],$$

wherein angle [x(n)] representing the phase of the signal x(n). In that, a plurality of butterfly units with each butterfly unit in the plurality of butterfly units comprises an adder, subtractor and a multiplier, wherein the adder, the subtractor and multiplier receive a phase only signals with a signal amplitude less than unity. The butterfly units are arranged in plurality of stages to perform the operation as in the first relation.

4 Claims, 5 Drawing Sheets

METHOD AND SYSTEM PROVIDING FOURIER TRANSFORM BASED SIGNAL PROCESSING WITH REDUCED COMPUTATIONAL COMPLEXITY

CROSS REFERENCES TO RELATED APPLICATIONS

This application claims priority from Indian patent application No. 201741033773 filed on Oct. 22, 2017 which is incorporated herein in its entirety by reference.

BACKGROUND

Technical Field

Embodiments of the present disclosure relate to digital signal processing and more particularly relates to method and systems for Fourier transform based signal processing with reduced computational complexity.

Related Art

Various signals such as audio, images, motion pictures, are processed for transmission, storage, better rendition etc. the processing of such signal includes, modulation, digitization, filtering, frequency translation etc. In one or more of such processing, the signal is subjected to Fourier Transformation and/or the variants of the Fourier transformation. Fast Fourier Transformation (FFT), Discrete Fourier Transformation (DFT), Inverse Fast Fourier Transformation (IFFT) etc., as is well known in the art. All such variants of the Fourier transform and the Fourier transform are referred to as FFT for the purpose of this disclosure.

The signals noted above and other processed signals carry information in its amplitude, frequency and in phase in combination or independently. Often, such information needs to be extracted, translated, and analyzed by employing several signal processing procedures. FFT is one such signal processing adapted for the purpose. Generally, the FFT is implemented using N/2 butterfly structures (known as Radix-2 algorithm), where N can be 64, 128, etc. for example, and each butterfly is at least comprising an adder and a multiplier. The butterfly and FFT are implemented as electronic combinational digital logic circuit and/or as set of operations performed in a processor. The FFT often forms a basic core to number of signal processing elements on an integrated circuit. Thus, any reduction of computational complexity of the butterfly or the FFT significantly enhances the performance of overall integrated circuit and system in general.

SUMMARY

According to an aspect of the present invention, a signal processor comprises an N-point phase FFT transformer operative to perform a FFT like transformation according to a first relation $$Y[k] = \sum_{n=0}^{n=N-1} \exp^{[j \, angle \, [x(n)]]} * \exp\left[\frac{-j2\pi kn}{N}\right],$$

wherein angle [x(n)] representing the phase of the input signal x(n). In that, a plurality of butterfly units with each butterfly unit in the plurality of butterfly units comprises an adder, subtractor and a multiplier, wherein the adder, the subtractor and multiplier receive a phase only signals with a signal amplitude less than or equal to unity. The butterfly units are arranged in plurality of stages to perform the operation as in the first relation.

According to another aspect the processor further comprises a first convertor to convert a first complex signal with amplitude to the phase only signal and comprises a second convertor to convert a real signal to the first complex signal.

According to another aspect, present invention provides a Fourier transformer operative to perform Fourier transform of a continuous signal x(t) according to relation $$X_p(\omega) = \frac{1}{T}\int_{t=0}^{T} \exp[j \, angle \, (x(t)] \exp(-j\omega t) dt,$$

in that, the $X_p(\omega)$ is the frequency domain representation of the continuous signal x(t).

DETAILED DESCRIPTION OF THE PREFERRED EXAMPLES

Figure 1:
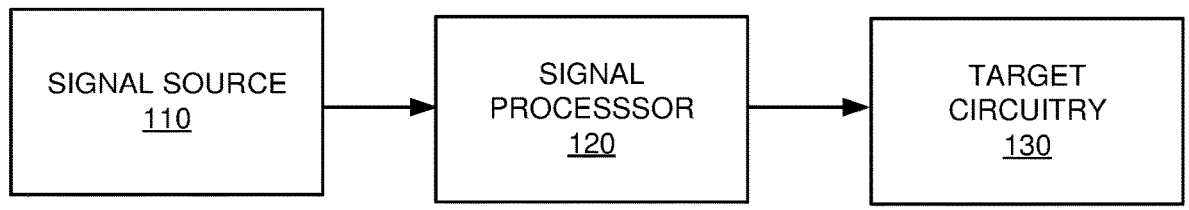
FIG. 1 is an example system in which various aspect of the present disclosure may be seen.

FIG. 1 is an example system in which various aspect of the present disclosure may be seen. The system is shown comprising signal source 110, signal processor 120 and target circuitry 130. Each block is described below in further detail.

The signal source 110 provides an input signal for processing. The input signal comprises an amplitude, frequency and phase part. The input signal may carry information in at least one of its amplitude, frequency and phase. The input signal may be in the analog, discrete and/or in digital form. For example, the input signal may be presented as "n" number of samples per second or "k" bits binary values of the samples. Input signal may comprise an in-phase and quadrature phase component, real and imaginary part (a complex signal) or real part.

The signal source 110 comprises sensors that generate electrical signals from physical and environmental conditions around it like microphone, camera, thermistors, baseband signal generator, modulator, frequency translator, receiver receiving RF signals from wireless and wired medium, antenna, other signal processing elements that provide a processed signal (like filters, amplifier, converters etc.,).

The signal processor 120 processes the input signal received from the signal source 110 to generate an output signal suitable for performing a desired operation in the target circuitry. In one embodiment the signal processor 120 performs an FFT operation on the input signal. The signal processor 120 may be implanted as digital logic circuit with multipliers, adders, registers, etc., or on a processor executing sequence of instruction to perform the FFT operation.

The target circuitry 130 comprises a transmitter, transmitting antenna, display, memory, graphical devices, transducers, speakers, external interface terminals, and other signal processing units performing further signal processing sequence of processing desired as part of the system. The target circuitry 130 receives the output signal from the signal processor 120 to perform next sequence of operation like transmit, display, render, store and further process, for example. The manner in which the FFT operation in the signal processor 120 may be implemented with reduced computational complexity is further described below.

Figure 2:
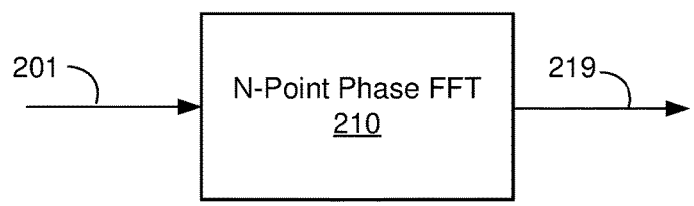
FIG. 2 is an example N-Point phase FFT in one embodiment.

FIG. 2 is an example N-Point phase FFT in one embodiment. The example N-Point Phase FFT 210 receives the input signal on the path 201 and performs an N-point phase FFT. The output of the N-point phase FFT is provided on path 219. The N-point phase FFT 210 uses only phase of the input signal to perform phase Fourier transform. The phase Fourier transform in the frequency domain may be represented by relation:

$$X_p(\omega) = \frac{1}{T} \int_{t=0}^{T} \frac{x(t)}{|x(t)|} \exp(-j\omega t) dt, \quad (1)$$

In that, the $X_p(\omega)$ represents the Phase only Fourier transform with other notation representing the corresponding standard notation used in regular Fourier transform relation. Alternatively, the Phase Fourier transform may be represented for a complex signal as:

$$X_p(\omega) = \frac{1}{T} \int_{t=0}^{T} \exp[j \text{ angle } (x(t)] \exp(-j\omega t) dt, \quad (2)$$

and for the real signal the Phase Fourier transform may be represented as:

$$X_p(\omega) = \frac{1}{T} \int_{t=0}^{T} \exp[j \text{ angle } (\tilde{x}(t)] \exp(-j\omega t) dt, \quad (3)$$

in that the x(t) is a complex input signal, $\tilde{x}(t)$ is the complex envelop of a real input signal and angle representing the phase of the signal x(t) or $\tilde{x}(t)$. For example, if x(t) is real signal like $x(t) = a_1 \cos \omega_1 t + a_2 \cos \omega_2 t$, then $\tilde{x}(t) = (a_1 \cos \omega_1 t + a_2 \cos \omega_2 t) + j(a_1 \sin \omega_1 t + a_2 \sin \omega_2 t)$, and the angle $$[\tilde{x}(t)] = \tan^{-1} \frac{(a_1 \sin \omega_1 t + a_2 \sin \omega_2 t)}{(a_1 \cos \omega_1 t + a_2 \cos \omega_2 t)}.$$

Further, when x(t) is the input signal in the time domain that is represented as the summation of a set of exponential (sinusoidal) signals of different frequency as:

$$x(t) = \sum_{k=1}^{K} a_k \exp^{-j\omega_k t} \quad (4)$$

then the phase Fourier Transform may be represented (neglecting higher order values in the magnitude) as:

$$X_p(\omega) \cong \frac{1}{T \sqrt{\sum_{k=1}^{K} |a_k|^2}} \sum_{k=1}^{K} a_k \int_{t=0}^{T} \exp^{(-j[\omega-\omega_k]t)} dt \quad (5)$$

Accordingly, the magnitude of the Phase only Fourier transform $X_p(\omega)$ shows the peaks proportional to the amplitude $a_k$ for each tone at frequency $\omega_k$ similar to conventional Fourier transform. The manner in which the N-point Phase FFT may be implemented in conjunction with the Phase Fourier transform in an embodiment is further described below.

Figure 4:
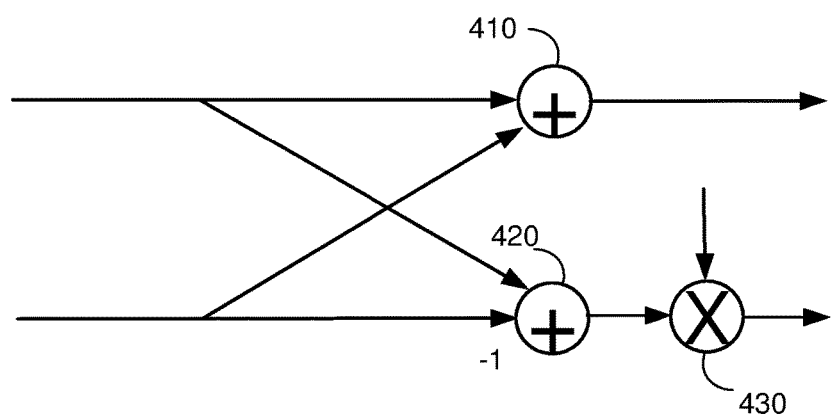
FIG. 4 is an example butterfly unit in one embodiment.
Figure 3:
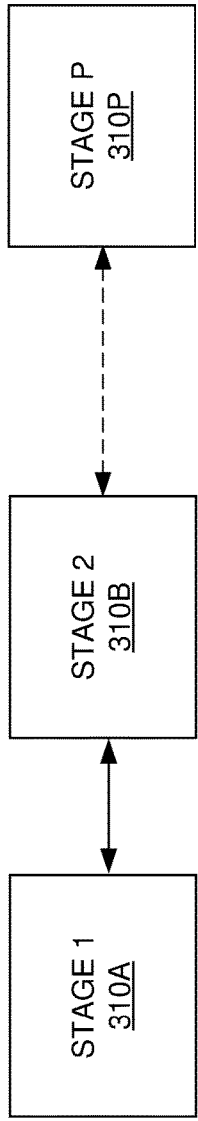
FIG. 3 is an example N-point phase FFT in one embodiment.

FIG. 3 is an example N-point phase FFT in one embodiment. The N-point phase FFT is shown comprising stages 310A through 310P. The number of stages may be equal to log p N (for Radix-p algorithm). That is, if N=8, and Radix-2 is used then number of stages is 3. Each stage 310A through 310P comprises butterfly computational units (hereafter butterfly unit). The number of butterfly unit in each stage is N/2. Each butterfly unit takes two complex numbers as its input and computes two other numbers. FIG. 4 is an example butterfly unit in one embodiment. As shown there the butterfly unit comprises adder 410 and 420, and multiplier 430. In one embodiment the adder 410 and subtractor 420 and multiplier 430 are implemented to operate on the lesser number of bits. The manner in which the adder 410 and subtractor 420 and multiplier 430 in the butterfly unit operate is further described with an example phase FFT (discretized version of continuous time phase FFT given in relation (2)) relation:

$$Y[k] = \sum_{n=0}^{n=N-1} \exp^{[j \text{ angle } [x(n)]]} * \exp\left[\frac{-j2\pi kn}{N}\right]. \quad (6)$$

The multiplier 430 performs a complex multiplication operation using a complex multiplication factor as in the relation (6) and the adder 410 and subtractor 420 operate to perform the summation and subtraction operation respectively before the multiplication operation is performed on the output of the subtraction. Accordingly, it may be readily seen that, the magnitude of the result of the multiplication is limited to a maximum of unity, and the result of the summation does not grow beyond additional one bit for each butterfly stage.

In contrast, in a conventional FFT, the amplitude part of the sinusoidal components (in the input signal) increases the dynamic range of the signal at the output of the adder and subtractor and thus result in higher precision for the multiplier that follows to multiply the result of the subtraction with the $$\exp\left[\frac{j2\pi kn}{N}\right]$$

(twiddle factor) in the summation, thus the result of the multiplication operation and addition operation may require higher number of bits for representation.

The reduction in the computational complexity is further illustrated with an example input signal as $x(n) = a_1 e^{j\omega_1 n} + a_2 e^{j\omega_2 n}$. The N-point phase FFT may be represented as:

$$Y[k] = \sum_{n=0}^{n=N-1} \left( \frac{a_1}{\sqrt{2(1+\cos(\omega_1-\omega_2)n}} e^{j\omega_1 n} + \frac{a_2}{\sqrt{2(1+\cos(\omega_1-\omega_2)n}} e^{j\omega_2 n} \right) * \exp\left[\frac{-j2\pi kn}{N}\right]. \quad (7)$$

In contrast, the conventional FFT is computed as:

$$Y[k] = \sum_{n=0}^{n=N-1} (a_1 e^{j\omega_1 n} + a_2 e^{j\omega_2 n}) * \exp\left[\frac{-j2\pi kn}{N}\right]. \quad (8)$$

It may be readily appreciated that the N-point phase FFT in relation 7 requires less precession or dynamic range for multiplication and addition than the relation 8. Accordingly, the multiplier 330 may be implemented with the less dynamic range. For example, if each phase components are represented by 10 bits, then relation 7 may be implemented with 21 bits to store intermediate values as against 31 or more bits required in case of relation 8. The manner in which Phase FFT may be employed for complex and real signals is further described below.

Figure 5:
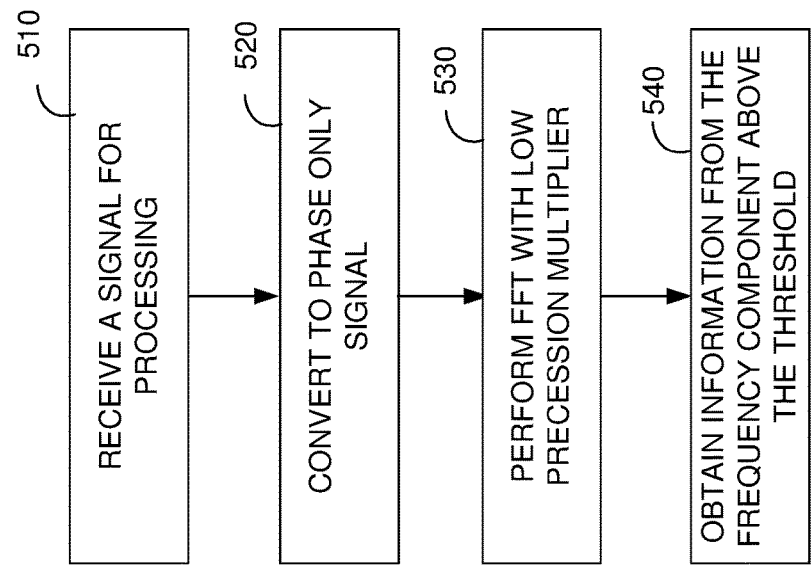
FIG. 5 is a block diagram illustrating the phase only FFT for a complex signal.

In one embodiment the input signal provided to the N-point phase FFT is first converted to phase only signal. FIG. 5 is a block diagram illustrating the phase only FFT for a complex signal. In block 510, the signal processor receives the input signal for processing. In block 520, the processor converts the input signal to a phase only signal. In one embodiment, input signal is converted to phase only signal using CORDIC (COordinate Rotation Digital Compute) technique. Several other known techniques may be employed to obtain the phase only single from the input signal. In block 530, the N-point phase FFT performs the phase FFT on the phase only signal. In block 540 the information about the location of the frequency components is obtained from the tone amplitudes which are above a threshold. Here, threshold is a design parameter to trade off the performance under noisy condition Vs spurious peaks appearing in the output for example.

Figure 6:
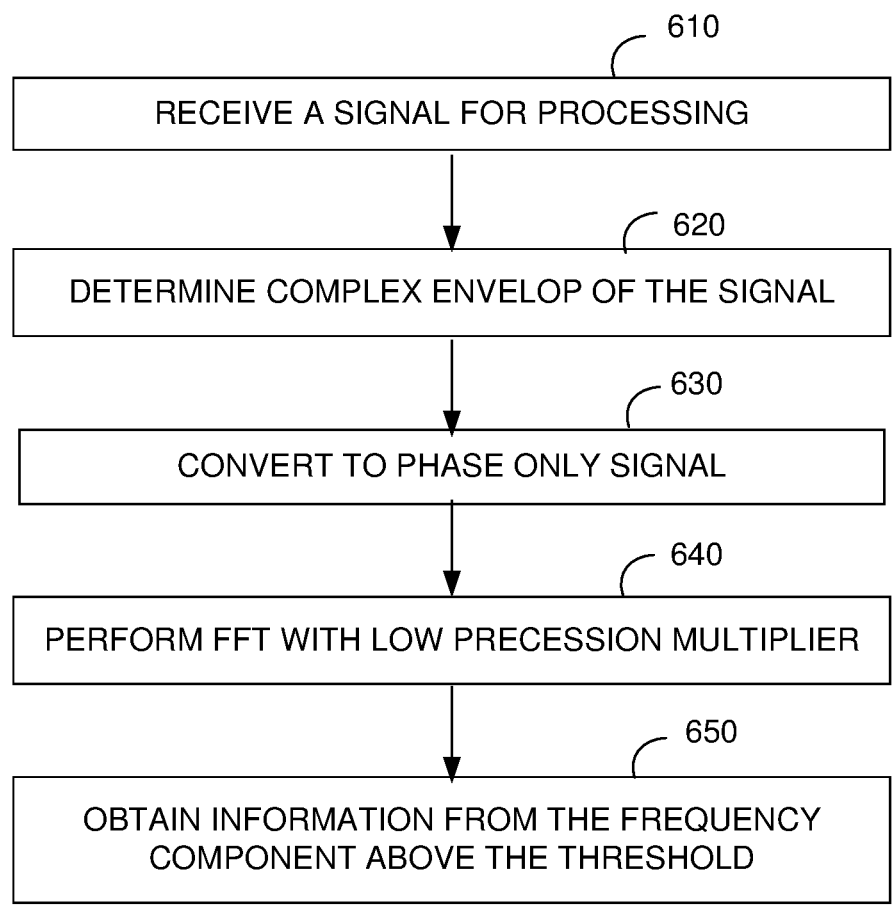
FIG. 6 is a block diagram illustrating the phase only FFT for a real signal in one embodiment.

FIG. 6 is a block diagram illustrating the phase only FFT for a real signal in one embodiment. In block 610, the signal processor receives the input signal for processing. In block 620, the real signal is converted to a complex signal. The input signal is transformed to complex signal using Hilbert transformation techniques. The complex signal is provided to block 630. In block 630, the processor converts the complex signal to a phase only signal similar to the block 520. In block 640, the N-point phase FFT performs the phase FFT on the phase only signal. In block 650 the information in the phase is obtained from the corresponding frequency tones.

Figure 7A:
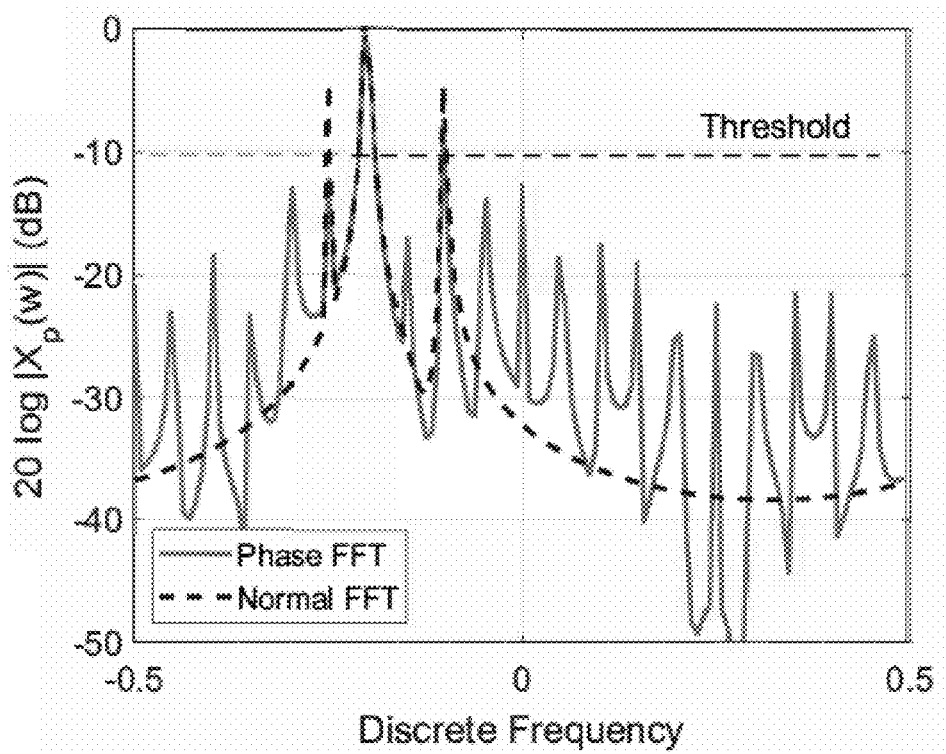
FIG. 7A-7D illustrates example energy spectrum of the 128 Point Phase FFT performed on complex and real signals with and without noise.
Figure 7B:
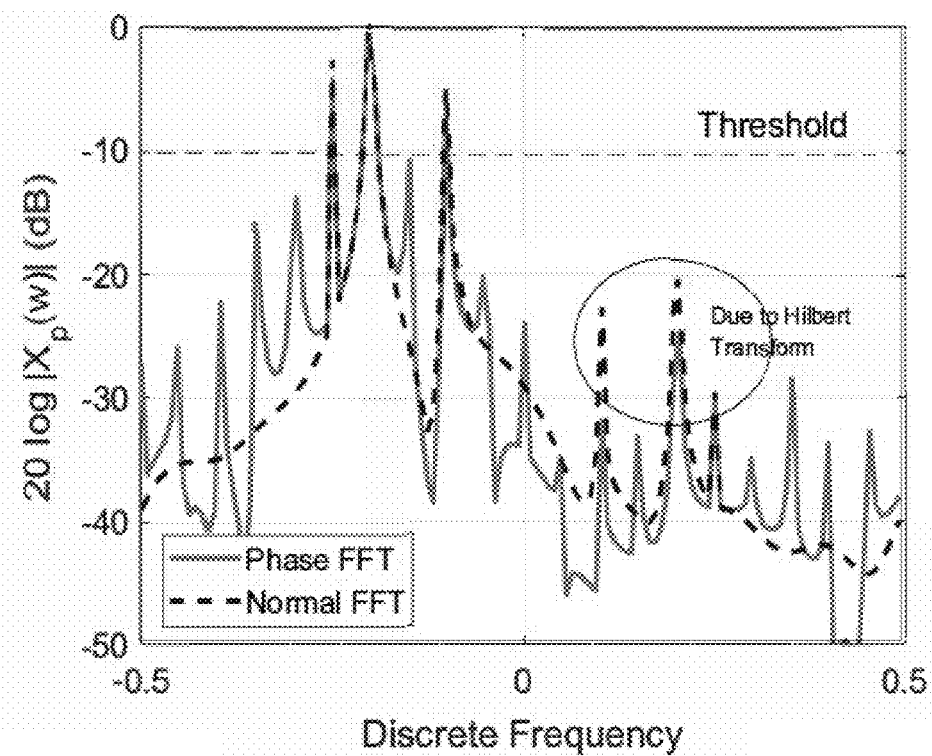

FIG. 7A-7D illustrates example energy spectrum of the 128 Point Phase FFT performed on complex and real signals with and without noise. In particular, FIG. 7A depicts 128 Point Phase FFT on a complex input signal comprising three tones at w1=−0.5, w2=−0.2 and w3=−0.25, with amplitude a1=1, a2=2 and a3=1. Accordingly, the 128 Point Phase FFT computed taking only phase of the input signal, exhibits peak at the respective tones without loss of information. Similarly, FIG. 7B depicts 128 Point Phase FFT on a real input signal comprising three tones at w1=−0.5, w2=−0.2 and w3=−0.25, with amplitude a1=1, a2=2 and a3=1. Accordingly, the 128 Point Phase FFT computed after converting the real signals to complex signal by Hilbert filter/transform and taking only phase of the input signal. The exhibits peak at the respective tones without loss of information.

Figure 7C:
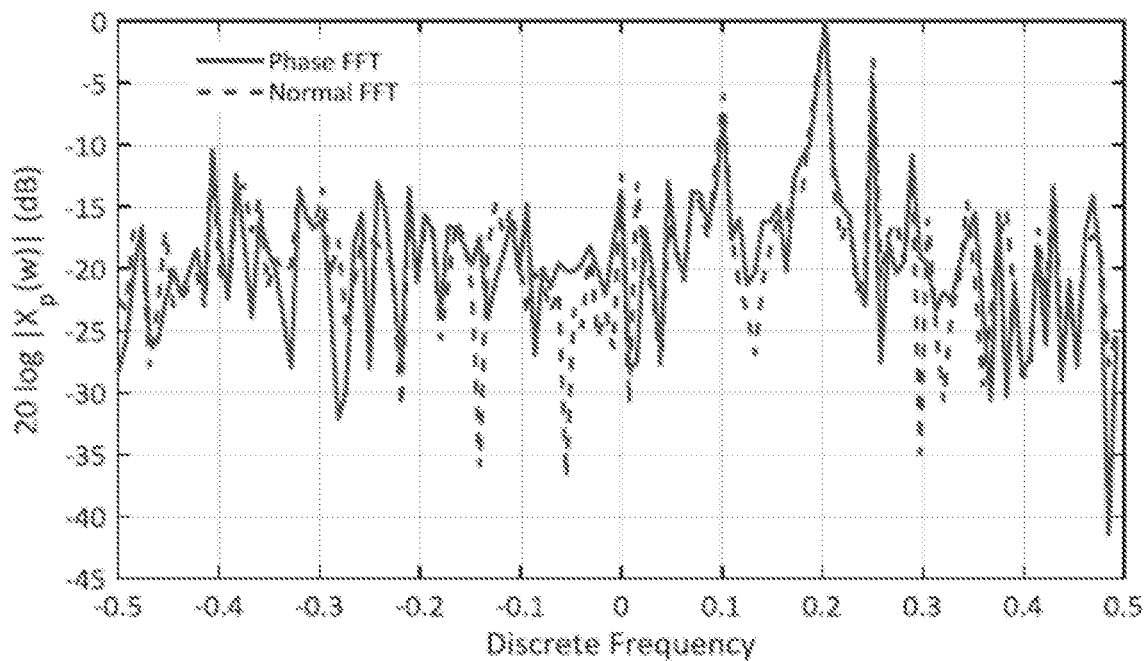
Figure 7D:
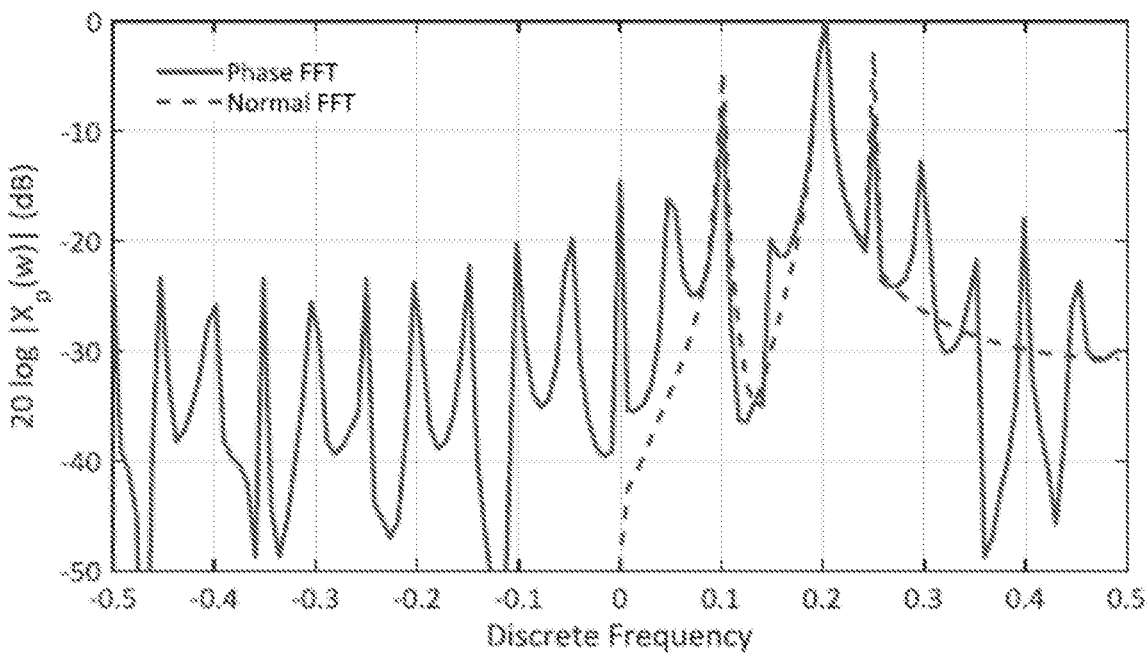

Similarly, FIG. 7C depicts 128 Point Phase FFT on a real input signal comprising three tones at w1=−0.5, w2=−0.2 and w3=−0.25, with amplitude a1=1, a2=2 and a3=1 with Gaussian noise of variance 4 added to it. Accordingly, the 128 Point Phase FFT computed after converting the real signals to complex signal by Hilbert filter/transform and taking only phase of the input signal. The exhibits peak at the respective tones without loss of information and the tones are recovered above the threshold. FIG. 7D depicts 128 Point Phase FFT on a real input signal comprising three tones at w1=−0.5, w2=−0.2 and w3=−0.25, with amplitude a1=1, a2=2 and a3=1 with Gaussian noise of variance 4 added to it. Accordingly, the 128 Point Phase FFT computed after converting the real signals to complex signal by Hilbert filter/transform and taking only phase of the input signal. The exhibits peak at the respective tones without loss of information and the tones are recovered above the threshold. Thus, it may be appreciated that, the Phase only FFT may be readily employed with reduced precession requirement for performing FFT operation.

While various embodiments of the present disclosure have been described above, it should be understood that they have been presented by way of example only, and not limitation. Thus, the breadth and scope of the present disclosure should not be limited by any of the above-discussed embodiments, but should be defined only in accordance with the following claims and their equivalents.

What is claimed is:

1. A signal processor comprising:
   A first converter to convert an input signal x(n) with an amplitude and a phase to a phase only signal; and
   an N-point phase FFT transformer operative to convert the phase only signal to an output signal Y[k] according to a first relation:

$$Y[k] = \sum_{n=0}^{n=N-1} \exp^{[j\, angle\ [x(n)]]} * \exp\left[\frac{-j2\pi kn}{N}\right],$$

wherein angle [x(n)] representing the phase of the phase only signal, in that N is an integer, and n and k representing sample number of a sequence of samples of the input signal x(n) and the output signal Y[k] respectively.

2. The signal processor of claim 1, further comprising a plurality of butterfly units with each butterfly unit in the plurality of butterfly units comprising an adder, subtractor and a multiplier, wherein the plurality of butterfly units configured to operate on the phase only signal, wherein the first converter converting the amplitude of the input signal to a value less than or equal to unity in the phase only signal.

3. The signal processor of claim 2, wherein the plurality of butterfly units are arranged in a plurality of stages to perform the operation as in the first relation, wherein the adder, the subtractor and the multiplier are configured to operate with lesser number of bits for the phase only signal as against the number of bits required to perform respective operation for the input signal.

4. The signal processor of claim 3, wherein the input signal is a complex signal and the signal processor further comprising a second convertor configured to convert a real signal to the input signal.

* * * * *